United States Patent
Parekh et al.

(10) Patent No.: US 11,396,631 B2
(45) Date of Patent: Jul. 26, 2022

(54) PROCESS PROVIDING IMPROVED BASE OIL YIELD

(71) Applicant: Chevron U.S.A. Inc., San Ramon, CA (US)

(72) Inventors: Jay Parekh, San Ramon, CA (US); Jifei Jia, Hercules, CA (US); Guan-Dao Lei, San Ramon, CA (US); Kenny Peinado, San Ramon, CA (US); Yihua Zhang, Albany, CA (US); Shanying Lee, Hercules, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 17/138,039

(22) Filed: Dec. 30, 2020

(65) Prior Publication Data

US 2022/0204875 A1 Jun. 30, 2022

(51) Int. Cl.
  *C10G 67/02* (2006.01)
  *C10M 101/02* (2006.01)
  *C10M 177/00* (2006.01)
  *C10N 70/00* (2006.01)

(52) U.S. Cl.
  CPC ........... *C10G 67/02* (2013.01); *C10M 101/02* (2013.01); *C10M 177/00* (2013.01); *C10G 2300/301* (2013.01); *C10G 2300/4018* (2013.01); *C10G 2400/04* (2013.01); *C10G 2400/10* (2013.01); *C10M 2203/1006* (2013.01); *C10N 2070/00* (2013.01)

(58) Field of Classification Search
  CPC .............. C10G 67/02; C10G 2300/301; C10G 2300/4018; C10G 2400/04; C10G 2400/10; C10M 101/02; C10M 177/00; C10M 2203/1006; C10N 2070/00
  See application file for complete search history.

(56) References Cited

U.S. PATENT DOCUMENTS

| | | | |
|---|---|---|---|
| 2005/0092653 A1* | 5/2005 | Farshid | C10G 2/30 208/89 |
| 2009/0233821 A1* | 9/2009 | Rosenbaum | C10M 111/00 508/110 |

* cited by examiner

*Primary Examiner* — Ellen M McAvoy
*Assistant Examiner* — Chantel L Graham
(74) *Attorney, Agent, or Firm* — E. Joseph Gess; Melissa M. Hayworth; Mark L. Warzel

(57) ABSTRACT

A process for preparing a base oil from a waxy hydrocarbon feedstock is provided. The process comprises passing the hydrocarbon feedstock to a distillation column prior to dewaxing in order to recover a heavy wax cut. The heavy wax is then hydrocracked to lower boiling compounds which can be better isomerized to a base oil with an acceptable cloud point. The base oil yield is also increased.

25 Claims, 1 Drawing Sheet

PROCESS PROVIDING IMPROVED BASE OIL YIELD

TECHNICAL FILED

Process for improving the yield of high quality base oils from a waxy hydrocarbon feedstock.

BACKGROUND

High quality lubricating oils are critical for the operation of modern machinery and motor vehicles. Finished lubricants used for automobiles, diesel engines, axles, transmissions, and industrial applications consist of two general components, a base oil and one or more additives. Base oil is the major constituent in these finished lubricants and contributes significantly to the properties of the finished lubricant. In general, a few base oils are used to manufacture a wide variety of finished lubricants by varying the mixtures of individual base oils and individual additives. Most crude oil fractions require moderate to significant upgrading to be suitable for lubricant manufacture. As an example, high-quality lubricating oils must often be produced from waxy feeds. Numerous processes have been proposed for producing lubricating base oils by upgrading ordinary and low quality feedstocks.

Hydrocarbon feedstocks may be catalytically dewaxed by hydrocracking or hydroisomerization. Hydrocracking generally leads to a loss in yield due to the production of lower molecular weight hydrocarbons, such as middle distillates and even lighter $C_4$-products, whereas hydroisomerization generally provides higher yields by minimizing cracking.

U.S. Pat. No. 8,475,648 describes processes and a catalyst for dewaxing a heavy hydrocarbon feedstock to form a lubricant base oil. A layered catalyst system is used. See also U.S. Pat. No. 8,790,507. U.S. Pat. No. 8,192,612 describes processes for preparing a base oil slate from a waxy feed. The disclosures of the foregoing patents are incorporated herein by reference in their entirety.

Heavy or high boiling wax in a waxy hydrocarbon feedstock can present challenges for the efficiency of a base oil process, and even impact the quality of the base oil process. High end boiling point waxes are difficult to be isomerized to a base oil with an acceptable cloud point. In the typical process, the heavy base oil with high cloud point obtained after the dewaxing process needs to be reprocessed before use by a customer is possible.

Improving the yield of the base oil product would be of great interest to the industry. Providing a process which can improve yield by efficiently overcoming the issues presented by heavy wax would be of paramount interest to the industry.

SUMMARY

A process for preparing a base oil from a waxy hydrocarbon feedstock is provided. The process comprises passing the hydrocarbon feedstock to a distillation column prior to dewaxing in order to recover a heavy wax cut. The heavy wax is then hydrocracked to lower boiling compounds which can be better isomerized to a base oil with an acceptable cloud point.

In one embodiment, provided is a process for preparing a base oil from a waxy hydrocarbon feedstock. The process comprises passing the hydrocarbon feedstock through a distillation column and collecting a light wax and fuel cut, a medium wax cut and a heavy wax cut. The heavy wax is then passed to a hydrocracking reactor, with the hydrocracked product passed from the reactor back to a distillation column. In one embodiment, the hydrocracked product is passed back to the first distillation column. The medium wax is passed to a hydrodewaxing reactor. In one embodiment, the hydrodewaxed product is passed to a hydrofinishing reactor. The product from the hydrofinishing reactor can be separated into base oil products and fuel products.

In another embodiment, a process is provided for preparing a base oil from a waxy hydrocarbon feedstock comprising passing the hydrocarbon feedstock through a first distillation column and collecting a light wax and fuel cut, a medium wax cut, and a heavy wax cut. The heavy wax is passed to a hydrocracking reactor, and the hydrocracked product is passed from the reactor to a second distillation column. The hydrocracked product passed to the second distillation column is separated into a light wax and fuel cut, a medium wax cut, and a heavy wax cut. In one embodiment, the medium wax cut of the second distillation column is combined with the medium wax cut of the first distillation column. The combined medium wax cuts are passed to a hydrodewaxing reactor. Product from the hydrodewaxing reactor is passed to a hydrofinishing reactor, with the product from the hydrofinishing reactor separated into base oil and fuel products. The heavy wax cut from the second distillation column is recirculated to the hydrocracking reactor.

Among other factors, the present processes provide efficient processes of improved base oil yield while overcoming the issues raised by heavy wax in the feedstock.

DETAILED DESCRIPTION

Figure 1:
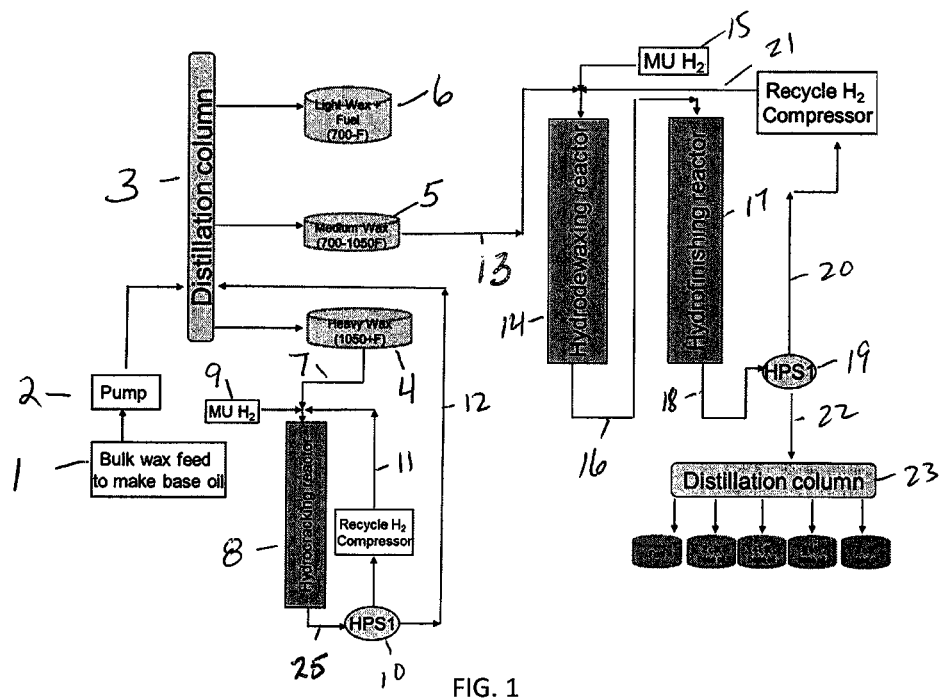
FIG. 1 schematically depicts a process to make base oil products where heavy wax is separated and hydrocracked in an embodiment utilizing two distillation columns.

The term "waxy feed" as used in this disclosure refers to a feed having a high content of normal paraffins (n-paraffins). A waxy feed useful in the practice of the present process scheme will generally comprise at least 40 wt. % n-paraffins, preferably greater than 50 wt. % n-paraffins, and more preferably greater than 75 wt. % n-paraffins. Preferably, the waxy feed used in the present process scheme will also have very low levels of nitrogen and sulfur, generally less than 25 ppm total combined nitrogen and sulfur and preferably less than 20 ppm. This can be achieved by hydrotreating before dewaxing.

A wide variety of hydrocarbon feedstocks can be used, including whole crude petroleum, reduced crudes, vacuum tower residua, synthetic crudes, foots oils, Fischer-Tropsch derived waxes, and the like. Typical feedstocks can include hydrotreated or hydrocracked gas oils, hydrotreated lube oil raffinates, brightstocks, lubricating oil stocks, synthetic oils, foots oils, Fischer-Tropsch synthesis oils, high pour point polyolefins, normal alphaolefin waxes, slack waxes, deoiled waxes and microcrystalline waxes. Other hydrocarbon feedstocks suitable for use in processes of the present process scheme may be selected, for example, from gas oils and vacuum gas oils; residuum fractions from an atmospheric pressure distillation process; solvent-deasphalted petroleum residua; shale oils, cycle oils; animal and vegetable derived fats, oils and waxes; petroleum and slack wax; and waxes produced in chemical plant processes.

In an embodiment, the hydrocarbon feedstocks can be described as waxy feeds having pour points generally above about 0° C., and having a tendency to solidify, precipitate, or otherwise form solid particulates upon cooling to about 0° C. Straight chain n-paraffins, either alone or with only slightly branched chain paraffins, having 16 or more carbon atoms may be referred to herein as waxes. The feedstock will usually be a $C_{10+}$ feedstock generally boiling above about 350° F. (177° C.). In contrast, the base oil products of the present process, resulting from hydroisomerization dewaxing of the feedstock, generally have lowered pour points below 0° C., typically below about −12° C., and often below about −14° C.

The present processes may also be suitable for processing waxy distillate stocks such as middle distillate stocks including gas oils, kerosenes, and jet fuels, lubricating oil stocks, heating oils, and other distillate fractions whose pour point and viscosity need to be maintained within certain specification limits.

Feedstocks for the present processes may typically include olefin and naphthene components, as well as aromatic and heterocyclic compounds, in addition to higher molecular weight n-paraffins and slightly branched paraffins. During the present processes, the degree of cracking of n-paraffins and slightly branched paraffins in the feed is strictly limited so that the product yield loss is minimized, thereby preserving the economic value of the feedstock.

In an embodiment, the feedstock comprises a heavy feed. Herein, the term "heavy feed" may be used to refer to a hydrocarbon feedstock wherein at least about 80% of the components have a boiling point above about 900° F. (482° C.). Examples of heavy feeds suitable for practicing the present process includes heavy neutral (600N) and bright stock.

According to one aspect of the present process, a wide range of feeds may be used to produce lubricant base oils in high yield with good performance characteristics, including low pour point, low cloud point, low pour-cloud spread, and high viscosity index. The quality and yield of the lube base oil product of the instant processes may depend on a number of factors, including the formation of the hydroisomerization catalysts, including layered catalyst systems and the configuration of the catalyst layers of the catalyst systems.

In the present processes, the waxy hydrocarbon feed is first passed to a distillation column. Any type of suitable distillation column, as is known in the art, can be used to separate the feed into various cuts. The cuts will include a heavy wax cut. In one embodiment, the heavy wax cut comprises components boiling at about 1050° F. (565° C.) and higher. Although the cut temperature can be altered if desired. A medium wax cut will also be separated. In one embodiment, the medium wax cut comprises components boiling in the range of about 600° F. (315° C.) to about 1050° F. (565° C.). Again, the temperature range can be varied and adjusted to any desired temperature range within the general range of 600° F. (315° C.) to 1050° F. (565° C.). For example, the medium cut can be taken of compounds boiling in the range of about 700° F. (371° C.) to about 1050° F. (565° C.). Or, the medium cut can be of boiling components in the range of from 700° F. (371° C.) to about 900° F. (482° C.). The medium cut range can be adjusted based on the ultimate desired product. More than one medium cut, of different temperature ranges, can also be taken. A light wax cut and fuel cut can then be recovered. This cut can comprise components boiling at least 600° F. (315° C.) and lower. Although the cut can always be adjusted to a desired temperature range, e.g., 700° F. (371° C.) and lower.

The type of distillation column can be any known in the art. For example, the column can be a packed type column or a tray type column. In a packed distillation column the vertical tower is packed in sections with ceramic raschig rings, ceramic saddles or steel pall rings. A reboiler at the bottom of the column adds heat to the column. Tray type columns operate on the same principle as packed columns. However, instead of using packed material, tray type columns use trays situated at various heights within the tower. Tray type columns facilitate multi-stage separation of products. The column can also be a vacuum distillation column or not. All distillation columns operate on the principal of separating a feed into its different chemical components based on differences in volatility.

In one embodiment, the heavy wax cut from the distillation column is passed to a hydrocracking reactor. Any suitable hydrocracking operation can be run. The catalyst in the hydrocracker can be selected from any known hydrocracking catalysts. The hydrocracking conditions generally include a temperature in the range of from 175° C. to 485° C., molar ratios of hydrogen to hydrocarbon charge from 1 to 100, a pressure in the range of from 0.5 to 350 bar, and a liquid hourly space velocity (LHSV) in the range of from 0.1 to 30.

The heavy wax is cracked into smaller molecules in the hydrocracking reactor. These smaller molecules are passed to a distillation column, in one embodiment, the distillation column from whence the heavy wax cut was taken. The smaller molecules would then be generally passed on from the distillation column in the medium wax cut, e.g., 600° F.-1050° F. (315° C.-565° C.). The result is that the yield of acceptable base oil is increased and the efficiency of the overall process is improved.

The medium wax cut from the distillation column is passed to a dewaxing reactor. The medium wax passed to the dewaxing reactor includes the original medium wax cut hydrocarbons from the feed and the medium wax cut hydrocarbons created by hydrocracking the heavy wax. Thus, the ultimate yield of acceptable cloud point base oil is increased. Preparing heavy base oils with a high cloud point, which would need to be reprocessed, is avoided.

Any light wax and/or fuel cuts will generally comprise components boiling below about 600° F. (315° C.). The light wax and fuel can be passed on for further processing in the refinery.

In another embodiment, the waxy hydrocarbon feedstock is passed to a first distillation column. This first distillation column creates at least three cuts, if not more, comprising a heavy wax cut, medium wax cut, and a light wax cut and/or fuel cut. As discussed previously, generally, the heavy wax cut comprises components boiling at about 1050° F. (565° C.) and higher, the medium wax cut comprises components boiling in the range of from about 600° F. (315° C.) to about 1050° F. (565° C.), and the light wax cut and fuel cut comprises components that boil at about 600° F. and lower. These specific cut temperatures, of course, can vary somewhat as desired, as discussed above. The variance is well within the skill of one in the art.

The heavy wax cut is passed to a hydrocracking reactor. Hydrocracked product from the reactor is then passed to a second distillation column, different from the first. A medium wax cut is obtained from the second distillation column. This medium wax cut can be passed to and combined with the medium wax cut from the first distillation column. The combined medium wax cuts are then passed to a hydrodewaxing reactor. A heavy wax cut can also be collected from the second distillation column. This heavy wax cut can be further processed throughout the refinery, or, in a preferred embodiment, recirculated to the hydrocracking reactor for further hydrocracking to smaller molecules. A light wax cut, including fuel, can be collected and passed to further processing.

Within the dewaxing reactor, the medium wax feed may first be contacted with a hydrotreating catalyst under hydrotreating conditions in a hydrotreating zone or guard layer to provide a hydrotreated feedstock. Contacting the feedstock with the hydrotreating catalyst in a guard layer may serve to effectively hydrogenate aromatics in the feedstock, and to remove N- and S-containing compounds from the feed, thereby protecting the first and second hydroisomerization catalysts of the catalyst system. By "effectively hydrogenate aromatics" is meant that the hydrotreating catalyst is able to decrease the aromatic content of the feedstock by at least about 20%. The hydrotreated feedstock may generally comprise $C_{10+}$ n-paraffins and slightly branched isoparaffins, with a wax content of typically at least about 20%.

Hydroisomerization catalysts useful in the present processes typically will contain a catalytically active hydrogenation metal. The presence of a catalytically active hydrogenation metal leads to product improvement, especially VI and stability. Typical catalytically active hydrogenation metals include chromium, molybdenum, nickel, vanadium, cobalt, tungsten, zinc, platinum, and palladium. The metals platinum and palladium are especially preferred, with platinum most especially preferred. If platinum and/or palladium is used, the total amount of active hydrogenation metal is typically in the range of 0.1 wt. % to 5 wt. % of the total catalyst, usually from 0.1 wt. % to 2 wt. %.

The refractory oxide support may be selected from those oxide supports, which are conventionally used for catalysts, including silica, alumina, silica-alumina, magnesia, titania and combinations thereof.

The conditions under which the present processes are carried out will generally include a temperature within a range from about 390° F. to about 800° F. (199° C. to 427° C.). In an embodiment, the hydroisomerization dewaxing conditions includes a temperature in the range from about 550° F. to about 700° F. (288° C. to 371° C.). In a further embodiment, the temperature may be in the range from about 590° F. to about 675° F. (310° C. to 357° C.). The total pressure may be in the range from about 500 to about 3000 psig (0.10 to 20.68 MPa), and typically in the range from about 750 to about 2500 psig (0.69 to 17.24 MPa).

Typically, the feed rate to the catalyst system/reactor during dewaxing processes of the present invention may be in the range from about 0.1 to about 20 h.sup.-1 LHSV, and usually from about 0.1 to about 5 h.sup.-1 LHSV. Generally, the present dewaxing processes are performed in the presence of hydrogen. Typically, the hydrogen to hydrocarbon ratio may be in a range from about 2000 to about 10,000 standard cubic feet $H_2$ gas per barrel hydrocarbon, and usually from about 2500 to about 5000 standard cubic feet $H_2$ gas per barrel hydrocarbon.

In an embodiment, the present process provides base oil production, e.g., from a waxy feed, using a layered catalyst system in the dewaxing reactor. The layered catalyst system may comprise first and second hydroisomerization catalysts, wherein the first hydroisomerization is disposed upstream from the second hydroisomerization catalyst. The first hydroisomerization catalyst may have a first level of selectivity for the isomerization of n-paraffins, the second hydroisomerization catalyst may have a second level of selectivity for the isomerization of n-paraffins. In an embodiment, the first and second levels of selectivity may be the same or at least substantially the same. A layered catalyst system, according to the present process, may provide superior results as compared with conventional dewaxing processes and catalysts.

The above reaction conditions may apply to the hydrotreating conditions of an optional hydrotreating zone as well as to the hydroisomerization conditions. The reactor temperature and other process parameters may vary according to factors such as the nature of the hydrocarbon feedstock used and the desired characteristics (e.g., pour point, cloud point, VI) and yield of the base oil product.

Before separating the fuel product and various grade of base oils, the product from the dewaxing reaction can first be forwarded to a hydrofinishing zone. Such hydrofinishing may be performed in the presence of a hydrogenation catalyst, as is known in the art. The hydrogenation catalyst used for hydrofinishing may comprise, for example, platinum, palladium, or a combination thereof on an alumina support. The hydrofinishing may be performed at a temperature in the range from about 350° F. to about 650° F. (176° C. to 343° C.), and a pressure in the range from about 400 psig to about 4000 psig (2.76 to 27.58 1 MPa). Hydrofinishing for the production of lubricating oils is described, for example, in U.S. Pat. No. 3,852,207, the disclosure of which is incorporated by reference herein.

Product from the dewaxing reactor, or product from the hydrofinishing reactor can then be passed on for separation into base oil products and fuel products. Generally, the separation is achieved in a distillation column. Base oils recovered from the distillation column will include a range of base oils grades. Typical base oil grades recovered from the distillation tower include, but are not necessarily limited to, XXLN, XLN, LN, and MN. An XXLN grade of base oil when referred to in this disclosure is a base oil having a kinematic viscosity at 100° C. between about 1.5 cSt and about 3.0 cSt, preferably between about 1.8 cSt and about 2.3 cSt. An XLN grade of base oil will have a kinematic viscosity at 100° C. between about 1.8 cSt and about 3.5 cSt, preferably between about 2.3 cSt and about 3.5 cSt. A LN grade of base oil will have a kinematic viscosity at 100° C. between about 3.0 cSt and about 6.0 cSt, preferably between about 3.5 cSt and about 5.5 cSt. An MN grade of base oil will have a kinematic viscosity at 100° C. between about 5.0 cSt and about 15.0 cSt, preferably between about 5.5 cSt and about 10.0 cSt. In addition to the various base oil grades, a diesel product may also be recovered from the vacuum tower.

Diesel fuels prepared/separated out as part of the product slate will generally have a boiling range between about 65° C. (about 150° C.) and about 400° C. (about 750° C.), typically between about 205° C. (about 400° F.) and about 315° C. (about 600° F.).

Further illustration of the present process can be obtained upon a review of the Figures of the Drawing. The figures are meant to be illustrative of certain embodiments and not limiting.

FIG. 1 depicts a base oil process in which two distillation columns are used. A bulk wax feed 1 is pumped by pump 2 to a distillation column 3. Three separate cuts are shown in FIG. 1, a heavy wax cut 4, medium wax cut 5, and a light wax and fuel cut 6. The heavy wax 4 is passed via 7 to a hydrocracking reactor 8. The hydrocracking reactor can be run under conventional conditions and in the presence of a conventional hydrocracking catalyst. Hydrogen 9 is added to the reactor.

The product from the hydrocracking reactor 8, which product comprises smaller, cracked molecules, is passed via conduit 25 through a high pressure separator 10. The separator separates $H_2$ from the liquid product, and the $H_2$ can be recycled via conduit 11 back to the hydrocracking reactor 8. The hydrocracked product is passed via conduit 12 back to the distillation column 3, where it is separated again with the majority of the product supplementing the medium wax cut 5. The end result is an increased yield of acceptable cloud point base oils.

The medium wax 5 is passed via conduit 13 to a hydrodewaxing reactor 14. Hydrogen 15 is added to the reactor 14. The resulting product from reactor 14 is passed via conduit 16 to a hydrofinishing reactor 17. Product from reactor 17 is passed via conduit 18 to a high pressure separator 19, which separates $H_2$ from the hydrofinished base oil product. The $H_2$ can be recycled via conduits 20 and 21 to the hydrodewaxing reactor. The hydrofinished product is passed via conduit 22 to a distillation column 23. The column separates the product into fuel and various grades of hydrofinished base oils.

Figure 2:
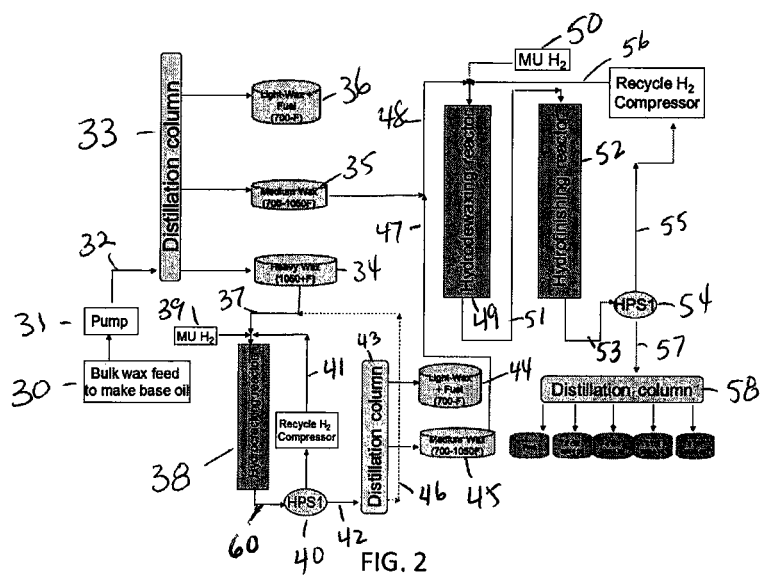
FIG. 2 schematically depicts a process to make base oil products where heavy wax is separated and hydrocracked in an embodiment utilizing three distillation columns.

FIG. 2 depicts a base oil process in which three distillation columns are used. A bulk wax feed 30 is pumped by pump 31 via conduit 32 to a distillation column 33. Three separate cuts are shown in FIG. 2, a heavy wax cut 34, a medium wax cut 35, and a light wax and fuel cut 36. The heavy wax 34 is passed via conduit 37 to a hydrocracking reactor 38. The reactor 38 can be run under conventional conditions and in the presence of conventional hydrocracking catalyst. Hydrogen 39 is added to the reactor.

Product from the reactor 38 is passed via conduit 60 through a high pressure separator 40. $H_2$ is separated and recycled via conduit 41 to the reactor 38. The hydrocracked product separated from the $H_2$ is then passed via conduit 42 to a second distillation column 43. The column 43 is shown as separating three cuts, a light wax cut 44, a medium wax cut 45, and a heavy cut, which heavy cut is recycled via conduit 46 back to the hydrocracking reactor 38 for further cracking.

The medium wax 45 is passed via conduit 47 for combining with the medium wax cut 35 from column 33. The combined cuts are then passed via conduit 48 to the hydrodewaxing reactor 49. Hydrogen 50 is added to the reactor 49. The resulting product from the reactor 49 is passed via conduit 51 to a hydrofinishing reactor 52. Product from reactor 52 is passed via conduit 53 to a high pressure separator 54, which separates $H_2$ from the hydrofinished base oil product. The $H_2$ can be recycled via conduits 55 and 56 to the hydrodewaxing reactor 49. The hydrofinished product is passed via conduit 57 to a distillation column 58. The column separates the product into fuel and various grades of hydrofinished base oils.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

Numerous variations of the present invention may be possible in light of the teachings and examples herein. It is therefore understood that within the scope of the following claims, the invention may be practiced otherwise than as specifically described or exemplified herein.

All of the publications cited in this disclosure are incorporated by reference herein in their entireties for all purposes.

That which is claimed is:

1. A process for preparing a base oil from a waxy hydrocarbon feedstock comprising:
   a) passing the waxy hydrocarbon feedstock through a distillation column and collecting a light wax and fuel cut, a medium wax cut and a heavy wax cut;
   b) passing the medium wax cut to a hydrodewaxing reactor;
   c) passing the heavy wax cut to a hydrocracking reactor to crack the heavy wax into smaller molecules, and passing hydrocracked product from the reactor to a distillation column; and
   d) passing a medium wax cut from the distillation column in c) to a hydrodewaxing reactor.

2. The process of claim 1, wherein the heavy wax cut comprises components boiling at about 1050° F. (565° C.) and higher.

3. The process of claim 1, wherein the medium wax cut comprises components boiling at about 600° F. (315° C.) to about 1050° F. (565° C.).

4. The process of claim 3, wherein the medium wax cut comprises components boiling at about 700° F. (371° C.) to about 1050° F. (565° C.).

5. The process of claim 1, wherein the light wax and fuel cut comprises diesel fuel.

6. The process of claim 5, wherein the light wax and fuel cut comprises components boiling at about 600° F. (315° C.) and lower.

7. The process of claim 6, where the light wax and fuel cut is passed to further processing.

8. The process of claim 1, wherein the hydrocracked product is passed to the distillation column in a).

9. The process of claim 1, wherein hydrodewaxed product is passed to a hydrofinishing reactor.

10. The process of claim 9, wherein the product of the hydrofinishing reactor is separated into base oil products and fuel products.

11. The process of claim 10, wherein the product from the hydrofinishing reactor is passed to a second distillation column for separating the product into a fuel product and various grades of base oil products.

12. The process of claim 11, wherein the various grades of base oil products comprise XLN, LN, and MN grades of base oil.

13. The process of claim 1, where the medium wax cut is hydrotreated prior to hydrodewaxing in the hydrodewaxing reactor.

14. The process of claim 1, wherein the hydrodewaxing reactor comprises a layered catalyst system.

15. A process for preparing a base oil from a waxy hydrocarbon feedstock comprising:
   a) passing the hydrocarbon feedstock through a distillation column and collecting a light wax and fuel cut, a medium wax cut and a heavy wax cut;
   b) passing the heavy wax cut to a hydrocracking reactor and passing hydrocracked product from the reactor to the distillation column in a);
   c) passing the medium wax cut from the distillation column in a) to a hydrodewaxing reactor and passing hydrodewaxed product from the reactor to a hydrofinishing reactor; and d) separating product from the hydrofinishing reactor into base oil products and fuel products.

16. A process for preparing a base oil from waxy hydrocarbon feedstock comprising:
   a) passing the hydrocarbon feedstock through a first distillation column and collecting a light wax and fuel cut, a medium wax cut, and a heavy wax cut;
   b) passing the heavy wax cut to a hydrocracking reactor and passing hydrocracked product from the reactor to a second distillation column;
   c) separating the hydrocracked product passed to the second distillation column into a light wax and fuel cut, a medium wax cut, and a heavy wax cut;
   d) combining the medium wax cut of the second distillation column with the medium wax cut of the first distillation column in a), and passing the combined medium wax cuts to a hydrodewaxing reactor;
   e) collecting and passing product from the hydrodewaxing reactor to a hydrofinishing reactor;
   f) separating product from the hydrofinishing rector into base oil and fuel products; and
   g) recirculating the heavy wax cut from the second distillation column in c) to the hydrocracking reactor.

17. The process of claim 16, wherein the product from the hydrofinishing reactor is passed to a third distillation column for separating the product into a fuel product and various grades of base oil products.

18. The process of claim 17, wherein the various grades of base oil products comprise XLN, LN, and MN grades of base oil.

19. The process of claim 16, wherein the heavy wax cuts of the first distillation column and the second distillation column comprise components boiling at about 1050° F. (565° C.) and higher.

20. The process of claim 16, wherein the medium wax cuts of the first and second distillation columns comprise components boiling in the range of about 600° F. (315° C.) to about 1050° F. (565° C.).

21. The process of claim 16, wherein the light wax and fuel cuts of the first and second distillation columns comprise diesel fuel.

22. The process of claim 21, wherein the light wax and fuel cuts comprise components boiling at about 600° F. (315° C.) and lower.

23. The process of claim 21, wherein the light wax and fuel cuts are passed to further processing.

24. The process of claim 16, wherein the combined medium wax cuts from the first and second distillation columns are hydrotreated prior to hydrodewaxing in the hydrodewaxing reactor.

25. The process of claim 16, wherein the hydrodewaxing reactor comprises a layered catalyst system.

* * * * *